United States Patent [19]

Kuroiwa et al.

[11] Patent Number: 4,701,085
[45] Date of Patent: Oct. 20, 1987

[54] METHOD AND APPARATUS FOR EXTERNAL BROACHING OF RESIN-COATED PARTS

[75] Inventors: Yosio Kuroiwa, Toyota; Takuo Sibata, Okazaki, both of Japan

[73] Assignee: Toyota Jidosha Kabushiki Kaisha, Toyota, Japan

[21] Appl. No.: 868,512

[22] Filed: May 30, 1986

[51] Int. Cl.$^4$ .................... B23D 37/12; B23D 41/06
[52] U.S. Cl. ........................... 409/244; 264/138; 264/161; 269/47; 409/247; 409/258; 409/277; 29/23.5; 29/156.8 CF
[58] Field of Search ............... 409/243, 244, 276–279, 409/247, 258, 271, 903, 256; 264/138, 139, 158, 161, 162, 163; 425/292, 295, 315; 269/47; 29/23.5, 156.8 CF

[56] References Cited

U.S. PATENT DOCUMENTS

| | | | |
|---|---|---|---|
| 2,050,901 | 8/1936 | Sundell | 409/279 |
| 2,225,731 | 12/1940 | Averill | 409/277 X |
| 2,335,515 | 11/1943 | Jehle | 425/315 X |
| 4,304,747 | 12/1981 | Lake | 264/163 X |

FOREIGN PATENT DOCUMENTS

| | | | |
|---|---|---|---|
| 5492405 | 12/1977 | Japan . | |
| 1077722 | 3/1984 | U.S.S.R. | 409/276 |

OTHER PUBLICATIONS

B. Wiedmann, SAE Technical Paper Series, (Development of Volkswagen's Supercharger G-Lader), Feb. 24–28, 1986.

*Primary Examiner*—Gil Weidenfeld
*Assistant Examiner*—Steven C. Bishop
*Attorney, Agent, or Firm*—Oblon, Fisher, Spivak, McClelland, & Maier

[57] ABSTRACT

Method and apparatus for broaching an outer surface of a resin layer of a resin-coated part whose external side surface is coated with the resin layer, wherein a backing plate is used to back the resin-coated part such that the plate is held in contact with an end face of the part at which a movable broach terminates a broaching cut in a direction along the outer surface of the resin layer. The backing plate has an external profile similar to a cutting edge contour of the broach. The backing plate is positioned on a work bed of the broaching apparatus such that its external profile is inwardly spaced from the cutting edge contour of the broach a plane perpendicular to the direction of movement of the broach. The backing plate, which forms a part of a work-holding fixture, serves to protect the resin layer from breakage, chipping or other defects at the end of a broaching pass along the outside of the resin-coated part.

9 Claims, 9 Drawing Figures

METHOD AND APPARATUS FOR EXTERNAL BROACHING OF RESIN-COATED PARTS

BACKGROUND OF THE INVENTION

1. Field of Art

The present invention relates in general to method and apparatus for broaching an outer surface of a resin layer which covers an external surface of a part, and more particularly to improved method and apparatus for external broaching operations on such external resin layers of a workpiece, without breakage, chipping or flake-off of the broached resin layers.

2. Related Art Statement

In the art of finishing a resin-coated part to desired external shape and dimensions, it is known to use a broaching method or apparatus for cutting an outer peripheral surface of a resin layer which covers the part. Such external broaching method and apparatus encounter an inconvenience that the resin layer is subject to local breakage, chipping, flake-off or other defects at or near the end of a broaching cut or pass in the direction along the resin layer to be broached. In broaching a resin-coated part 64 shown in FIG. 6, for example, the reaction force of a resin layer 62, which resists a shearing force exerted by a broach 60, decreases as the broach 60 approaches the end of its broaching movement toward the lower end of the part 64. Then, the amount of deformation of the resin layer 62 over the unbroached length to provide the reaction force resisting the shearing force increases as the unbroached length decreases. As a result, the lower end or corner portion of the resin layer 62 is broken or chipped, and the resin layer 62 is more or less separated or peeled off the surface of the part 64, as indicated in FIGS. 7 and 8.

Examples of resin-coated parts includes a rotor assembly 66 of a Roots pump shown in FIG. 9, which includes a rotor 65 made of a metallic material and coated with the resin layer 62. In this case, the chipping of the resin layer 62 at its corner portion during the broaching cut results in a gap 70 being formed between the inner surface of a pump housing 68 and the rotor assembly 66, whereby there arises a reverse flow of a fluid through the gap 70, which deteriorates the pumping capability of the Roots pump.

SUMMARY OF THE INVENTION

It is according an object of the present invention to provide an improved method of broaching an outer surface of a resin layer of a resin-coated part, without the above-indicated defects of the resin layer at the end of a broaching pass.

Another object of the invention is the provision of a broaching apparatus suitable for practicing the method of the invention.

According to the present invention, there is provided a method of broaching an outer surface of a resin layer of a resin-coated part whose external side surface is coated with the resin layer, comprising the steps of: (a) preparing a broaching apparatus with a movable broach having a cutting edge contour corresponding to a desired shape to which the resin-coated part is finished by broaching the outer surface; (b) preparing a backing plate having an external profile similar to the cutting edge contour of the broach, and having an external dimension smaller than the cutting edge contour by a predetermined slight value; (c) positioning the backing plate on a work bed of the broaching apparatus such that the external profile is inwardly spaced from the cutting edge contour of the broach in a plane perpendicular to a direction of movement of the broach; and (d) placing the resin-coated part on the backing plate such that the backing plate is held in contact with an end face of the part at which the broach terminates a broaching cut in the direction.

According another aspect of the invention, there is provided a broaching apparatus for broaching an outer surface of a resin layer of a resin-coated part whose external side surface is coated with the resin layer, comprising: (1) a broach movable along the outer surface of the resin layer, and having a cutting edge contour corresponding to a desired shape to which the resin-coated part is finished by broaching the outer surface; and (2) work holding means for holding the resin-coated part, the work holding means comprising a work bed and a backing plate mounted on the work bed, the backing plate having an external profile which is similar to the cutting edge contour of the broach, and which is inwardly spaced by a predetermined slight distance from the cutting edge contour of the broach in a plane perpendicular to a direction of movement of the broach, the backing plate backing the resin-coated part such that the backing plate is held in contact with an end face of the part at which the broach terminates a broaching cut in the direction of movement of the broach.

In the broaching method and apparatus of the present invention described above, the shearing force exerted to the terminal portion of the resin layer near the end of a broaching cut or pass of the broach is substantially entirely received by the backing plate which backs the resin-coated part at its end face on the side of termination of the broaching cut. Therefore, the terminal protion of the resin layer will not be deformed, and the terminal portion of the resin layer may be broached without breakage, chipping, flake-off or peel-off, or other defects as experienced in the conventional method.

The broaching method or apparatus of the invention may be suitably used for broaching an outer resin layer which covers a metallic rotor assembly of a Roots pump. In this case, the Roots pump using the rotor assemblies processed according to the present invention does not suffer deterioration of pumping performance due to a gap caused by chipping of the resin layer of the rotor assembly during the broach-finishing operation of the rotor assembly.

According to one feature of the method of the present invention, the resin-coated part is positioned into alignment with the backing plate by a positioning pin which projects from the backing plate into a positioning hole provided in the end face of the resin-coated part.

In one form of the above feature of the method, the backing plate has a first pin hole, and is positioned on the work bed of the broaching apparatus. The work bed hads a second pin hole aligned with the first pin hole. The positioning pin is axially movable in the first and second pin holes in the direction of movement of the broach, for engagement with the positioning hole in the resin-coated part.

In the above case, it is preferred that an amount of projection of the positioning pin from the backing plate is adjustable.

According to one feature of the apparatus of the invention, the backing plate has a first hole formed therethrough in the direction of movement of the broach, while the work bed has a second hole aligned with the first hole. The first and second pin holes cooperate to receive a positioning pin such that one of opposite end portions of the positioning pin projects from the backing plate for engagement with a positioning hole provided in the end face of the resin-coated part.

In one form of the feature of the broaching apparatus of the invention, the work bed has means for adjusting an amount of projection of the above-indicated one end portion of the positioning pin from the backing plate. In this case, the adjusting means may comprise an eccentric periphery cam supported in the second hole rotatably about an axis perpendicular to the direction of movement of the broach. The eccentric periphery cam is adapted to contact the other end portion of the positioning pin. The above-indicated one end portion of the positioning pin may be tapered so that a small end thereof is positioned in the positioning hole. A diameter of the small end is selected to be smaller than a diameter of the positioning hole while a diameter of a large end of the tapered one end portion is selected to be larger than the diameter of the positioning hole.

BRIEF DESCRIPTION OF THE DRAWINGS

The foregoing and other objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

Figure 1:
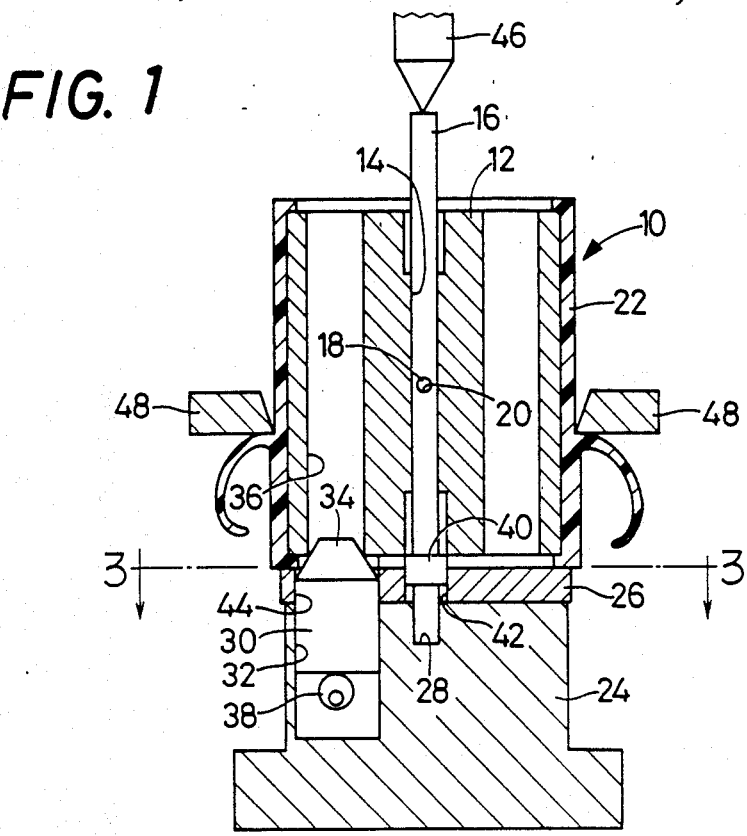
FIG. 1 is a front elevational view in cross section of one embodiment of a broaching machine of the present invention, and a workpiece mounted thereon, illustrating a broaching operation according to the principle of the invention.
Figure 2:
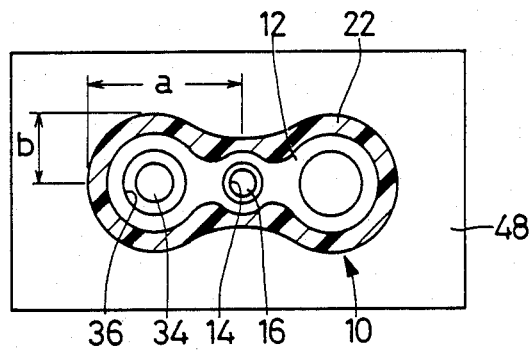
FIG. 2 is a plan view of the broaching machine and the workpiece of FIG. 1, with a center 46 removed.

Referring first to FIG. 1, there is shown a resin-coated part or workpiece in the form of a rotor assembly 10 mounted on a broaching machine (partly shown in the figure) constructed according to the principle of the present invention. The rotor assembly 10 is one of a plurality of rotor assemblies incorporated in a housing of a Roots pump such that the rotor assemblies are rotatable at the same speed. The assembly 10 includes a rotor 12 and a support shaft 16 which are made of metallic materials. The shaft 16 has a large-diameter portion 40 at one of its longitudinal opposite end portions, and is press-fitted in an axial bore 14 formed through the rotor 12. A lock pin 18 is inserted in pin holes 20 which are formed through the rotor 12 and the shaft 16 in the direction perpendicular to the axis of rotation of the shaft 16. Thus, the rotor 12 and the shaft 16 are fixed to each other for simultaneous rotation without a movement relative to each other. To protect the rotor assembly 10 from wear or abrasion due to interference between the adjacent rotor assemblies or the rotor assemblies and an inner surface of the Roots pump housing, the external side surface of the rotor 12 is coated or covered with a resin layer 22 formed of a fluorine-contained resin or other suitable resin. The rotor assembly 10 covered with the resin layer 22 has a transverse cross sectional shape similar to the shape of a cocoon or peanut shell, as shown in FIG. 2.

The resin-coated rotor assembly 10 (hereinafter referred to as a "resin-coated part" or "workpiece" as needed) is finished to a desired shape by broaching the outer surface of the resin layer 22 on the broaching machine shown in FIG. 1. The broaching machine or apparatus has a work holding device including a work bed 24 on which a backing plate 26 is mounted for backing the resin-coated part 10 as depicted in FIG. 1. Described more specifically, the work bed 24 has a central hole 28 formed in its top surface. The central hole 28 has a diameter selected to receive the end portion of the shaft 16 (on the side of the large-diameter portion 40) in a snug fit fashion. In the top surface of the work bed 24, there is also formed a pin hole 32 (second pin hole) parallel to and spaced apart from the central hole 28.

The backing plate 26 has a guide hole 42 aligned with the central hole 28 in the work bed 24, and a pin hole 44 (first pin hole) aligned with the pin hole 32 in the work bed 24. With the workpiece 10 mounted on the backing plate 26, the large-diameter portion 42 of the shaft 16 snugly engages the guide hole 42, while a positioning hole in the form of a bore 36 in the rotor 12 engages a tapered end portion 34 of a positioning pin 30. The positioning pin 30 is vertically slidably received in the aligned two pin holes 32, 44 formed in the work bed 24 and the backing plate 26, as indicated in FIG. 1. The tapered end portion 34 of the positioning pin 30 has a small end adapted to be positioned in the bore 36 open in the end face of the resin-coated workpiece 10 contacting the backing plate 26. That is, the diameter of the small end of the tapered end portion 34 is small than the diameter of the bore 36. Further, the large end of the tapered end portion 34 (i.e., the diameter of the positioning pin 30) is selected to be larger than the diameter of the bore 36.

For adjusting the amount of projection of the tapered end portion 34 of the positioning pin 30, an eccentric periphery cam 38 is disposed within the pin hole 32 such that the cam 38 is rotatable about its axis perpendicular to the direction of movement of the positioning pin 30 in the holes 32, 44. The peripheral surface of the cam 38 is held in sliding contact with the end face of the positioning pin 30 remote from the tapered end portion 34. In this arrangement, the positioning pin 30 is axially moved toward and away from the bottom end face of the workpiece 10, when the eccentric periphery cam 38 is rotated about its axis.

Figure 3:
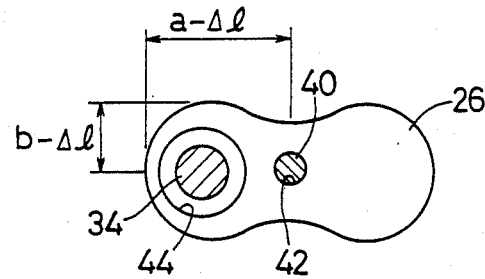
FIG. 3 is a cross sectional view taken along line 3—3 of FIG. 1.

Referring further to FIG. 3, the backing plate 26 has an external profile similar to the desired external shape of the finished or broached workpiece or rotor assembly 10, that is, similar to a cutting edge contour of a broach 48 which will be described. Further, the external dimension of the backing plate 26 is smaller by a predetermined value Δl than the external dimension of the workpiece 10 after the outer surface of the resin layer 22 has been broached with a predetermined amount of stock removed. In other words, the external profile of the backing plate 26 is inwardly spaced by the distance Δl away from the cutting edge contour of the broach 48 in a plane perpendicular to the direction of movement of the broach 48 (direction of broaching pass parallel to the axis of the rotor assembly 10). Therefore, dimensions "a" and "b" of the broached outside of the workpiece 10 as seen in FIG. 2 correspond to dimensions "a −Δl" and "b −Δl" of the backing plate 26 as indicated in FIG. 3. In this connection, it is noted that the view of FIG. 2 is taken in the direction from a center 46 toward the work bed 24, with the center 46 removed, while the cross sectional view of FIG. 3 is taken along line 3—3 of FIG. 1.

The broach 48 is supported by a suitable support structure (not shown) so that the broach 48 is vertically reciprocable along the axis of the rotor assembly 10, that is, in the direction perpendicular to the plane of the backing plate 26 on the work bed 24.

To mount the resin-coated workpiece or rotor assembly 10 on the backing plate 26 on the work bed 24, the broach 48 and the center 46 are first moved to their upper retracted position. The workpiece 10 is then mounted on the backing plate 26 such that the lower end portion of the shaft 16 (on the side of the large-diameter portion 42) is received in the central hole 28 while the large-diameter portion 40 is fitted in the guide hole 42. Subsequently, the center 46 is lowered to push the shaft 16 at its upper end. Thus, the resin-coated workpiece 10 to be broached is clamped on the broaching machine, with its lower end face held in contact with the upper surface of the backing plate 26.

Successively, the workpiece 10 is positioned in its circumferential direction by the positioning pin 30. Described in more detail, the eccentric periphery cam 38 is rotated so as to push the positioning pin 30 slidably received in the first and second pin holes 44, 32, whereby the tapered end portion 34 is brought into contact with the edge of the bore 36 open in the bottom face of the workpiece 10. Thus, the eccentric periphery cam 38 serves as means for adjusting the amount of projection of the tapered end 34 from the upper surface of the backing plate 26.

The resin-coated workpiece 10 is accurately positioned on the backing plate 26. In this condition, the broach 48 whose cutting edge contour is alinged with the outer pheriphery of the resin layer 22 is then fed downward along the rotor assembly 10, to effect an external broaching cut on the outer surface of the resin layer 22, removing a suitable amount of stock. Thus, the resin-coated rotor assembly 10 is finished to the desired shape corresponding to the cutting edge contour of the broach 48.

Figure 4:
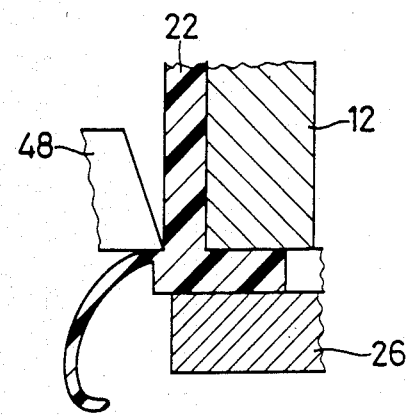
FIGS. 4 and 5 are fragmentary enlarged elevational views, illustrating a broaching cut on a resin layer of the workpiece, by the broaching machine of FIG. 1.
Figure 5:
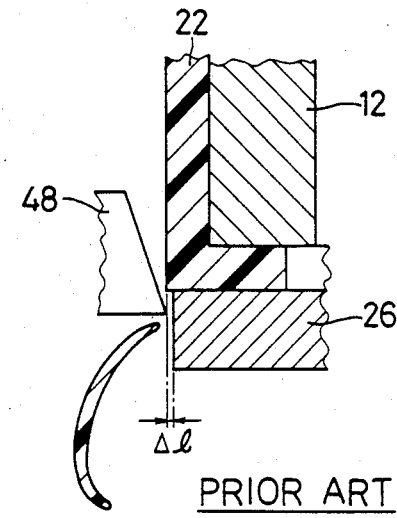
Figure 6:
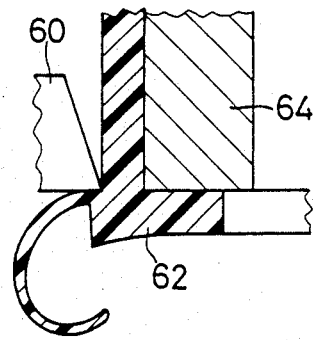
FIGS. 6 and 7 are views corresponding to FIGS. 4 and 5, showing a broaching cut according to a known broaching method.
Figure 7:
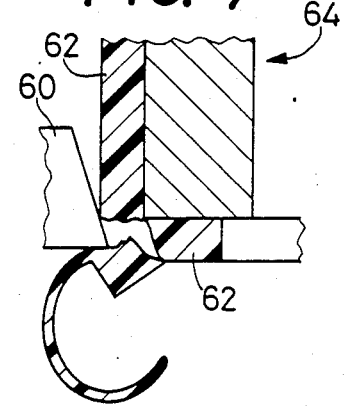
Figure 8:
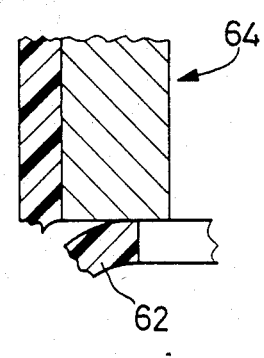
FIGS. 8 and 9 are views illustrating defects caused in the known broaching operation of FIGS. 6 and 7.

In a conventional broaching operation without using a backing plate, as indicated in FIG. 6, the area of a resin layer 62 which receives a shearing force decreases as a broach 60 approaches the lower end of its broaching cut (the bottom of the workpiece). As a result, the amount of deformation of the resin layer 62 over the unbroached length to provide a reaction force resisting the shearing force increases as the unbroached length decreases. Therefore, the resin layer 62 is eventually broken or chipped at or near the end of the broaching cut or pass, as indicated in FIGS. 7 and 8, and may flake or peel off. This will spoil the broached rotor assembly 10. According to the broaching method and apparatus illustrated in FIGS. 1-5 and described above, however, the backing plate 26 supporting the workpiece 10 at its bottom face backs the resin layer 22 over a substantial portion of its thickness as indicated in FIGS. 4 and 5. In this arrangement, substantially the entire shearing force exerted from the broach 48 to the unbroached lower end portion of the resin layer 22 is received by the backing plate 26. Accordingly, the unbroached lower end portion of the resin layer 22 will not be defomed, and the lower end portion of the resin layer 22 can be broached without breakage or chipping, as indicated in FIGS. 4 and 5.

Figure 9:
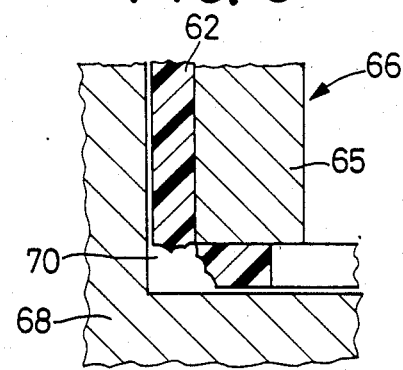

As described above, the rotor assembly 10 finished according to the illustrated embodiment of the invention does not suffer breakage, chipping, flake-off, peel-off or other defects of the resin layer 22 at the end of broaching cut. Namely, the Roots pump using the rotor assemblies 10 processed according to the instant method does not suffer an inconvenience experienced in the prior art Roots pump, that is, deteriorioation in the pumping performance due to a reverse flow of a pressurized fluid through a gap 70 caused by the chipping of a corner portion of a resin layer 62, between the inner surface of a pump housing 68 and a rotor 65 of a rotor assembly 66, as shown in FIG. 9.

The broach 48 will not interfere with the periphery of the backing plate 26 when the cutting edge is moved past the backing plate 26, since the external profile of the backing plate 26 is inwardly spaced away from the cutting edge contour of the broach 48 by the distance Δl. Experiments conducted by the inventors indicate that the distance Δl is preferably 0.1 mm or shorter where the resin layer 22 is formed of a fluorine-contained resin.

While the present invention has been described in its preferred embodiment for broaching a coccoon-shaped or peanut-shell-shaped rotor assembly of a Roots pump, the invention is equally applicable to a rotor assembly of other shapes such as a trefoil-shaped rotor assembly.

While the broach 48 used in the illustrated embodiment is a one-piece formed broach having an internal cutting edge contour corresponding to the external profile of the resin-coated rotor assembly 10, it is possible to use a split broach which consists of a plurlity of divisions which cooperate to define a cutting edge contour.

Further, the resin layer 22 formed of a fluorine-contained thermoplastic resin may be replaced by a resin layer made of other resin materials.

It will be understood that the invention may be embodied with various other changes, modifications and improvements which may occur to those skilled in the art, in the light of the foregoing teaching, without departing from the spirit and scope of the invention defined in the appended claim.

What is claimed is:

1. A method of broaching an outer surface of a resin layer of a resin-coated part having a metallic body whose external side surface is coated with the resin layer, comprising the steps of:

preparing a broaching apparatus with a movable broach having a cutting edge contour corresponding to an entirety of a desired external profile of said resin-coated part to which said resin-coated part is finished by broaching said outer surface of said resin layer;

preparing a backing plate having an external profile similar to said cutting edge contour of said broach, and having an external dimension smaller than said cutting edge contour by a predetermined slight value, said external dimension of said backing plate being larger than a contour of said external side surface of said metallic body;

positioning said backing plate on a work bed of said broaching apparatus such that said external profile of said backing plate is inwardly spaced from said cutting edge contour of said broach in a plane perpendicular to a direction of movement of said broach; and placing said resin-coated part on said backing plate such that said backing plate is held in contact with an end face of said part at which said broach terminates a broaching cut in said direction.

2. A method of broaching an outer surface of a resin layer of a resin-coated part whose external side surface is coated with the resin layer, comprising the steps of:

preparing a broaching apparatus with a movable broach having a cutting edge contour corresponding to a desired shape to which said resin-coated part is finished by broaching said outer surface of said resin layer;

preparing a backing plate having an external profile similar to said cutting edge contour of said broach, and having an external dimension smaller than said cutting edge contour by a predetermined slight value;

positioning said backing plate on a work bed of said broaching apparatus such that said external profile of said backing plate is inwardly spaced from said cutting edge contour of said broach in a plane perpendicular to a direction of movement of said broach, and such that a first pin hole formed in said backing plate is aligned with a second pin hole formed in said work bed;

placing said resin-coated part on said backing plate such that said backing plate is held in contact with an end face of said part at which said broach terminates a broaching cut in said direction; and positioning said resin-coated part into alignment with said backing plate by projecting a positioning pin from the aligned first and second pin holes into a positioning hole provided in said end face of said resin-coated part.

3. A method according to claim 2, further comprising a step of adjusting an amount of projection of said positioning pin from said backing plate.

4. A broaching apparatus for broaching an outer surface of a resin layer of a resin-coated part whose external side surface is coated with the resin layer, comprising:

a broach movable along said outer surface of said resin layer, and having a cutting edge contour corresponding to a desired shape to which said rotor is finished by broaching said outer surface of said resin layer;

work holding means for holding said resin-coated part, said work holding means comprising a work bed and a backing plate mounted on said work bed, said backing plate having an external profile which is similar to said cutting edge contour of said broach, and which is inwardly spaced by a predetermined slight distance from said cutting edge contour of said broach in a plane perpendicular to a direction of movement of said broach, said backing plate backing said resin-coated part such that said backing plate is held in contact with an end face of said part at which said broach terminates a broaching cut in said direction;

said backing plate having a first pin hole formed therethrough in said direction of movement of said broach, said work bed having a second pin hole aligned with said first pin hole; and a positioning pin received in the aligned first and second pin holes such that one of opposite end portions of said positioning pin projects from said aligned first and second pin holes, for engagement with a positioning hole provided in said end face of said resin-coated part.

5. A broaching apparatus according to claim 4, wherein said work bed has means for adjusting an amount of projection of said one end portion of the positioning pin from said backing plate.

6. A broaching apparatus according to claim 5, wherein said adjusting means comprising an eccentric periphery cam supported in said second hole rotatably about an axis perpendicular to said direction of movement of said broach, said eccentric periphery cam contacting the other end portion of said positioning pin.

7. A broaching apparatus according to claim 5, wherein said one end portion of said positioning pin is tapered so that a small end thereof is positioned in said positioning hole, a diameter of said small end being smaller than a diameter of said positioning hole while a diameter of a large end of said tapered one end portion being larger than the diameter of said positioning hole.

8. A method of broaching an outer surface of a resin layer of a fluorine-contained resin which covers an external surface of a rotor of a metallic material for a Roots pump, comprising the steps of:

preparing a broaching apparatus with a movable broach having a cutting edge contour corresponding to an entirety of a desired external profile of said rotor to which said rotor is finished by broaching said outer surface of said resin layer;

preparing a backing plate having an external profile similar to said cutting edge contour of said broach, and having an external dimension smaller than said cutting edge contour by a predetermined slight value, said external dimension of said backing plate being larger than a contour of said external surface of said rotor;

positioning said backing plate on a work bed of said broacing apparatus such that said external profile of said backing plate is inwardly spaced from said cutting edge contour of said broach in a plane perpendicular to a direction of movement of said broach; and placing said resin-coated part on said backing plate such that said backing plate is held in contact with an end face of said part at which said broach terminates a broaching cut in said direction.

9. A broaching apparatus for broaching an outer surface of a resin layer of a resin-coated part having a metallic body whose external side surface is coated with the resin layer, comprising:

a broach movable along said outer surface of said resin layer, and having a cutting edge contour corresponding to an entirety of a desired external profile of said rotor to which said rotor is finished by broaching said outer surface of said resin layer; and word holding means for holding said resin-coated part, said work holding means comprising a work bed and a backing plate mounted on said work bed, said backing plate having an external profile which is similar to said cutting edge contour of said broach, and which is inwardly spaced by a predetermined slight distance from said cutting edge contour of said broach in a plane perpendicular to a direction of movement of said broach, said external profile of said backing plate being outwardly spaced from a contour of said external side surface of said metallic body in said plane, said backing plate backing said resin-coated part such that said backing plate is held in contact with an end face of said part at which said broach terminates a broaching cut in said direction.

* * * * *

UNITED STATES PATENT AND TRADEMARK OFFICE
CERTIFICATE OF CORRECTION

PATENT NO. : 4,701,085
DATED : Oct. 20, 1987
INVENTOR(S) : Yosio Kuroiwa, et al

It is certified that error appears in the above-identified patent and that said Letters Patent is hereby corrected as shown below:

On the title page insert Foreign Application Priority Data

-- June 14, 1985 Japan [JP] ............... 60-130409 --

Signed and Sealed this

First Day of March, 1988

Attest:

DONALD J. QUIGG

*Attesting Officer*     *Commissioner of Patents and Trademarks*